(12) United States Patent
Xue et al.

(10) Patent No.: US 9,128,780 B2
(45) Date of Patent: Sep. 8, 2015

(54) VALIDATING LICENSE SERVERS IN VIRTUALIZED ENVIRONMENTS

(75) Inventors: Gang Xue, Shanghai (CN); Qiufang Shi, Shanghai (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 719 days.

(21) Appl. No.: 13/402,121

(22) Filed: Feb. 22, 2012

(65) Prior Publication Data
US 2013/0219505 A1    Aug. 22, 2013

(51) Int. Cl.
| | |
|---|---|
| G06F 15/16 | (2006.01) |
| G06F 9/00 | (2006.01) |
| G06F 17/00 | (2006.01) |
| G06F 7/04 | (2006.01) |
| G06F 12/00 | (2006.01) |
| G06F 12/14 | (2006.01) |
| G06F 13/00 | (2006.01) |
| G06F 17/30 | (2006.01) |
| G11C 7/00 | (2006.01) |
| H04L 29/06 | (2006.01) |
| G06F 9/52 | (2006.01) |
| H04L 29/08 | (2006.01) |
| G06F 3/06 | (2006.01) |
| H04W 4/00 | (2009.01) |
| G06F 21/10 | (2013.01) |
| G06F 21/73 | (2013.01) |

(52) U.S. Cl.
CPC ............... *G06F 9/526* (2013.01); *G06F 3/067* (2013.01); *G06F 17/302* (2013.01); *G06F 17/30197* (2013.01); *G06F 21/10* (2013.01); *G06F 21/73* (2013.01); *H04L 29/08549* (2013.01); *H04L 63/08* (2013.01); *H04L 63/10* (2013.01); *H04W 4/003* (2013.01); *G06F 2221/0704* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,782,637 | B2 * | 7/2014 | Khalid | 718/1 |
| 2009/0183010 | A1 | 7/2009 | Schnell et al. | |
| 2009/0300607 | A1 * | 12/2009 | Ferris et al. | 718/1 |
| 2010/0332456 | A1 | 12/2010 | Prahlad et al. | |
| 2011/0099616 | A1 | 4/2011 | Mazur et al. | |
| 2012/0011244 | A1 * | 1/2012 | Zhu | 709/224 |

FOREIGN PATENT DOCUMENTS

KR    10-1107056    1/2012

OTHER PUBLICATIONS

Mell, Peter and Grance, Timothy, "The NIST Definition of Cloud Computing" National Institute of Standards and Technology, Sep. 2011, 7 pages.

* cited by examiner

*Primary Examiner* — Azizul Choudhury
(74) *Attorney, Agent, or Firm* — Timothy Churna; Sade Fashokun; Micky Minhas

(57) ABSTRACT

The present invention extends to methods, systems, and computer program products for validating license servers in virtualized environments. Embodiments of the invention leverage a set of features acquired or built in cloud computing environments to facilitate a software based solution providing uniqueness and immutability of a license server hosted in the cloud. Avoiding features of the underlying hardware systems results a much more flexible and reliable platform for hosting license servers. Features of a cloud storage service can be used to create a unique ID for a license server. Security and reliability of license servers hosted in a pubic cloud environment is also improved.

20 Claims, 3 Drawing Sheets

VALIDATING LICENSE SERVERS IN VIRTUALIZED ENVIRONMENTS

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In network environments, applications can be moved between computer systems. To deter piracy, many applications rely on a floating software license and license servers. The floating software license is deployable on a license server so as to prevent from being abused. An application can be installed on any computer system. However, unless there is a valid license, the application will not run. To determine if an application can run on a computer system, the computer system queries the license server to determine if there is a valid license for the application.

To insure only a specified target license server is used, the target license server needs to be identified through a unique ID (e.g., fingerprint). In some environments, the unique ID is formulated distinctive and immutable features of an underlying hardware system, such as, for example, a Media Access Control ("MAC") address of a Network Interface Card ("NIC"). In other embodiments, a combination of hard and software characters of a target license server can be used to formulate a unique ID. The unique ID is provided to application instances so that target license server can be queried.

Unfortunately, virtual systems do not inherently possess characteristics that can be used to generate a unique ID and thus deter piracy. In a virtual system, hardware characteristics, such as, for example, BIOS GUIDs and MAC addresses can be spoofed. Spoofed hardware characteristics can then be used to clone a license server. Further, when operating in a cloud environment, cloud instances are transient virtual machines that are not bound to underlying hardware. Accordingly, hardware characteristics cannot be reliably used to formulate unique IDs in virtualized systems. Due at least in part to these difficulties, many application End User License Agreements ("EULAs") prohibit execution on virtual systems.

BRIEF SUMMARY

The present invention extends to methods, systems, and computer program products for validating license servers in virtualized environments. In some embodiments, a cloud instance hosts a license server in a cloud computing environment. The license server is validated as the target license server for a software license.

A validation event is detected for the license server. The validation event indicates that the license server is to check status as the target license server for the software license. The software license is installable at a license server having a unique identifier. The unique identifier is based on a unique name associated with a cloud-based object within the cloud computing environment.

The license server requests to assume exclusive ownership of the cloud-based object in response to the event. The cloud-based object has exclusivity of ownership such that a single license server can own the cloud-based object at any time. The license server is granted exclusive ownership of the cloud-based object. The license server uses the unique name to establish the unique identifier as the identifier for the license server.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
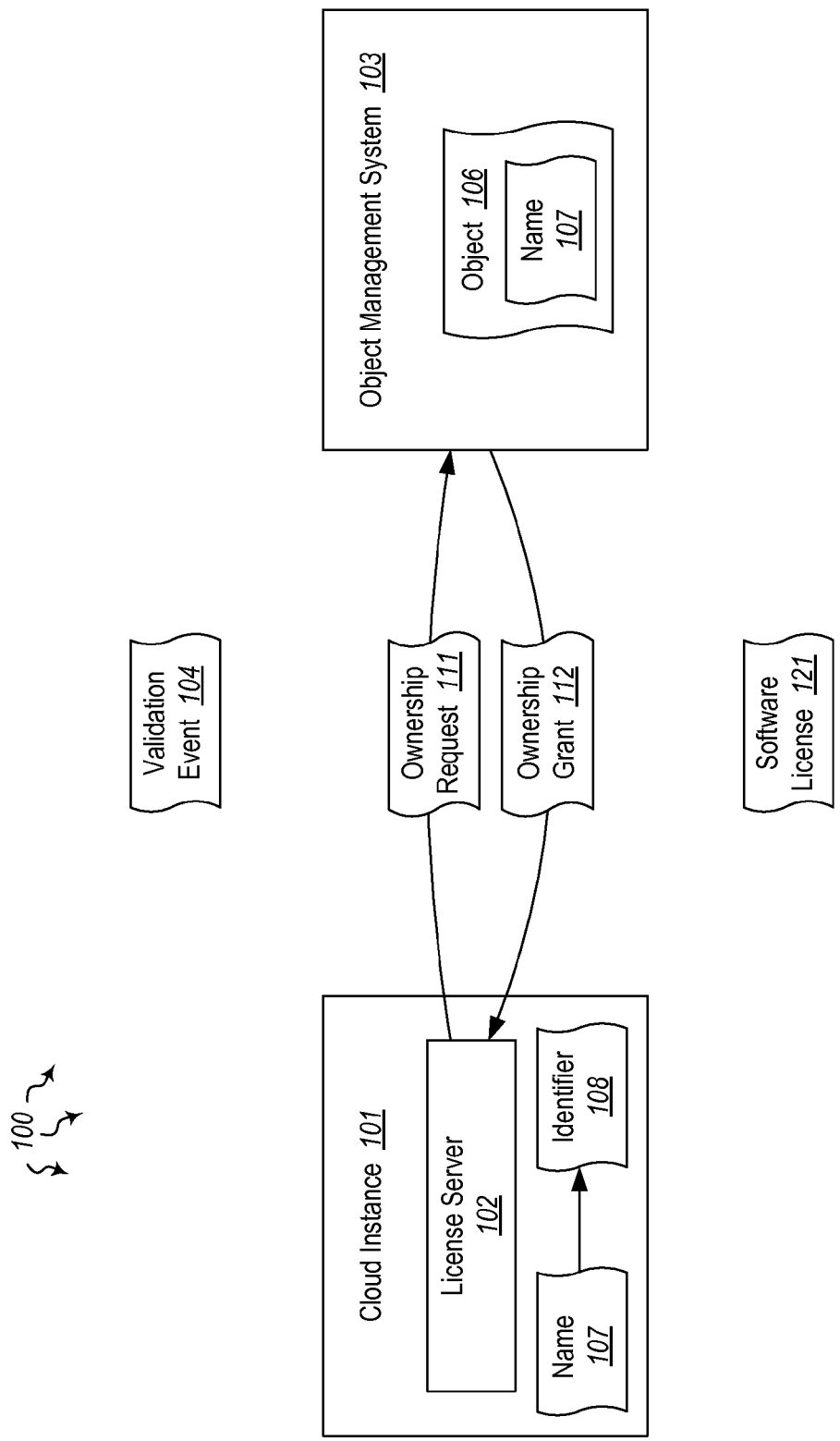
FIG. 1 illustrates an example computer architecture that facilitates validating license servers in virtualized environments.

The present invention extends to methods, systems, and computer program products for validating license servers in virtualized environments. In some embodiments, a cloud instance hosts a license server in a cloud computing environment. The license server is validated as the target license server for a software license.

A validation event is detected for the license server. The validation event indicates that the license server is to check status as the target license server for the software license. The software license is installable at a license server having a unique identifier. The unique identifier is based on a unique name associated with a cloud-based object within the cloud computing environment.

The license server requests to assume exclusive ownership of the cloud-based object in response to the event. The cloud-based object has exclusivity of ownership such that a single license server can own the cloud-based object at any time. The license server is granted exclusive ownership of the cloud-based object. The license server uses the unique name to establish the unique identifier as the identifier for the license server.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In this description and the following claims, "cloud computing" is defined as a model for enabling ubiquitous, convenient, on-demand network access to a shared pool of configurable computing resources (e.g., networks, servers, storage, applications, and services) that can be rapidly provisioned and released with minimal management effort or service provider interaction. A cloud model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates an example computer architecture 100 that facilitates validating license servers in virtualized environments. Referring to FIG. 1, computer architecture 100 includes cloud instance 101 and object management system 103. Cloud instance 101 can be one of number of cloud instances operating within a cloud. Cloud instance 101 and object management system 103 can be connected to one another over (or is part of) a network, such as, for example, a Local Area Network ("LAN"), a Wide Area Network ("WAN"), and even the Internet. Accordingly, cloud instance 101 and object management system 103 as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, cloud instance 101 includes license server 102. License server 102 can be a server that responds to license requests (e.g., from applications or other software modules). Object management system 103 can manage objects, such as, for example, accounts, files, users, etc, that are accessible from cloud instances (or from a cloud environment in general). Objects managed by object management system 103 can be given unique names. Objects managed by object management system 103 can also be configured for exclusive access (i.e., the objects can be owned by a single could instance at any time).

Software license 121 can be stored within computer architecture 100.

Figure 2:
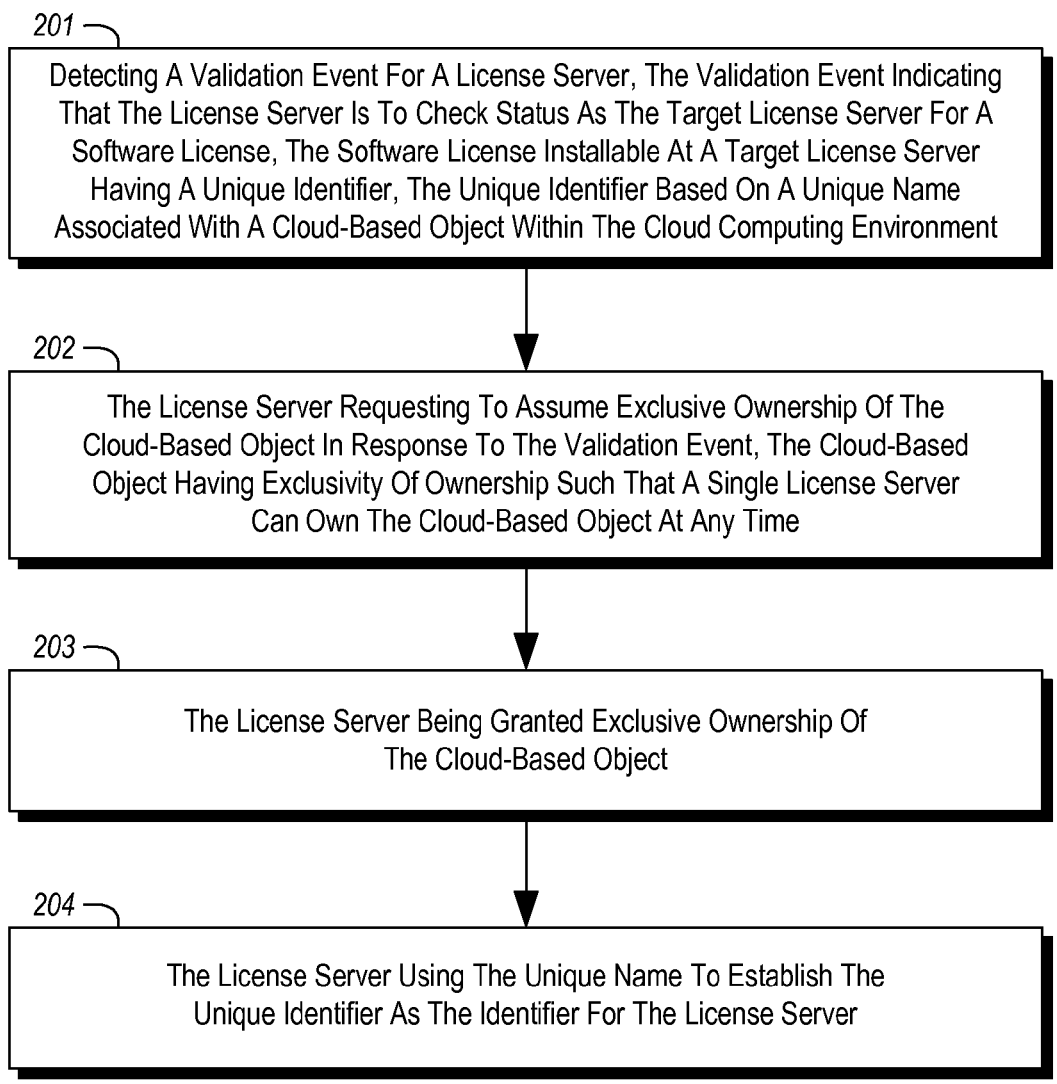
FIG. 2 illustrates a flow chart of an example method for validating license servers in virtualized environments.

FIG. 2 illustrates a flow chart of an example method 200 for validating license servers in virtualized environments. Method 200 will be described with respect to the components and data of computer architecture 100.

Method 200 includes an act of detecting a validation event for a license server, the validation event indicating that the license server is to check status as the target license server for the software license, the software license installable at a license server having a unique identifier, the unique identifier based on a unique name associated with a cloud-based object within the cloud computing environment (act 201). For example, validation event 104 can be detected. Validation event 104 can indicate that license server 102 is to check status as the target license server for software license 121. Software license 121 is installable at a license server having a unique identifier based on name 107 (the name of object 106). Object 106 can be an object with an exclusive access right. As such, object 106 (and corresponding properties) can be owned by a single license server at any time. Detecting a validation event can include detecting that software license 121 was stored in the cloud computing environment. Detecting a validation event can include detecting that a specified period of time has expired (e.g., since the status of license server was last checked).

Method 200 includes an act of license server requesting to assume exclusive ownership of the cloud-based object in response to the validation event, the cloud-based object having exclusivity of ownership such that a single license server can own the cloud-based object at any time (act 202). For example, license server 102 can send ownership request 111 to object management system 103 in response to validation event 104. Ownership request 111 can be a request to assume ownership of object 106 (a cloud-based object).

Method 200 includes an act of the license server being granted exclusive ownership of the cloud-based object (act 203). For example, object management system 103 can grant ownership of object 106 to license server 102. Object management system 103 can formulate ownership grant 112 indicating ownership of object 106. Object management system 103 can send ownership grant 112 to license server 102.

Subsequently, license server 102 can access object 106 and corresponding properties, including name 107.

Method 200 includes an act of the license server using the unique name to establish the unique identifier as the identifier for the license server (act 204). For example, license server 102 can use name 107 to establish identifier 108 as the identifier for license server 102. Other components (e.g., applications) can then direct license requests corresponding to software license 121 to license server 102. When appropriate, these other components can verify that license server 102 is in possession of identifier 108 (and is thus the license server for software license 121).

Embodiments of the invention include using a storage system that supports storage accounts referenced by globally unique account names. The storage system is accessible from a cloud environment where the license server is hosted. Inside each storage account, there is an entity whose access right can only be owned by a single license server in the cloud at any time. By combining globally unique storage account names with an exclusive access right to the specific unique entity, a unique ID can be created that a single instance in the cloud can possess at any time.

Thus, a software license issued by an Independent Software Vendor ("ISV") can use the unique storage account name to specify where it can be installed. The license server in the cloud periodically checks the ownership of the access right to the specific unique entity in that storage account. Checking ownership helps insure that the license server is the only license server bound to the corresponding unique ID. Accordingly, the license cannot be repeatedly deployed on multiple license server instances.

Ownership of a unique ID can be secured through security mechanisms of the underlying storage system. That is, a license server cannot assume a unique storage account name as its unique ID without access rights to the specific unique entity within this account. Thus, it is possible to leverage reliability features of a cloud environment for hosting a license server. For example, unlike hardware based IDs, storage account based IDs can be easily transferred from one cloud instance to another.

Some embodiments of the invention are implemented in a Windows Azure™ platform. These embodiments utilize a globally exclusive Azure storage account name with an exclusive mapping of a specific page blob within the storage account as a Windows Azure XDrive. A page blob is a collection of (e.g., 512-byte) pages used for random read and write operations. An xDrive enables a Windows Azure™ application to use existing Application Program Interfaces ("APIs") to access a durable drive. This allows Windows Azure™ applications to mount a page blob as a drive letter (e.g., "X:"). The mapping is used to create an ID that one Azure instance can possess at any time.

An Azure storage account name can be a formal DNS name which is globally unique. Windows Azure XDrive permits the lease of a page blob formatted as a single New Technology File System ("NTFS") volume Virtual Hard Drive ("VHD") for mounting an XDrive to be exclusively owned by a single Azure instance. This makes an XDrive effectively a mutex for Azure instances. A software license can therefore use an Azure storage account name to identify its installation location. The license server periodically checks the validity of the XDrive mapping to make sure that it owns the ID, and terminates itself when it is no longer the owner.

Figure 3:
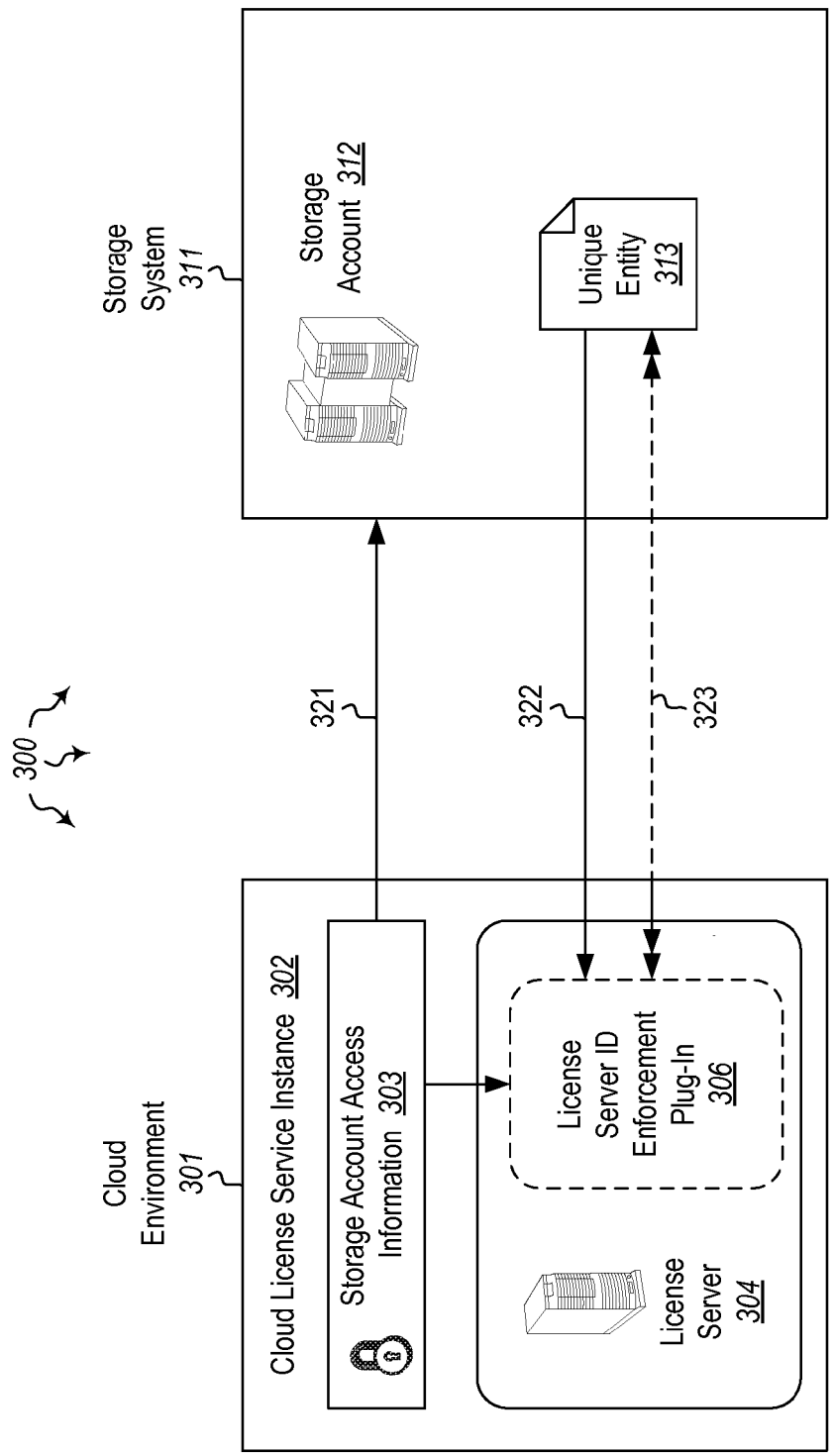
FIG. 3 illustrates another example computer architecture that facilitates validating license servers in virtualized environments.

FIG. 3 illustrates another example computer architecture 300 that facilitates validating license servers in virtualized environments. As depicted, computer architecture 300 includes cloud environment 301 and storage system 311. Cloud environment 301 and storage system 311 can be connected to one another by a network connection.

Cloud environment 301 includes cloud license service instance 302. Cloud license service instance 302, storage account access information 303 and license server 304, which further includes enforcement plug-in 306. Storage system 311 includes storage account 312, which further includes unique entity 313.

As indicated by arrow 321, cloud license service instance 302 holds storage account access information 303 for storage account 312 (a storage account cloud license service instance 302 is bound to). As indicated by arrow 322, license server 304, through license server ID enforcement plug-in 306, locates unique entity 313 in storage account 312. License server 304 attempts to assume an exclusive access right to unique entity 313. If the attempt fails, cloud license service instance 302 can shut itself down. As indicted by arrow 323, license server 304 periodically checks ownership of the exclusive access right. If ownership is ever lost, cloud license service instance 302 can attempt to recover it. If the attempt fails, cloud license service instance 302 can shut itself down.

Accordingly, embodiments of the invention leverage a set of features acquired or built in cloud computing environments to facilitate a software based solution providing uniqueness and immutability of a license server hosted in the cloud. Avoiding features of the underlying hardware systems results a much more flexible and reliable platform for hosting license servers. Features of a cloud storage service can be used to create a unique ID for a license server. Security and reliability of license servers hosted in a pubic cloud environment is also improved.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a cloud instance in a cloud computing environment, the cloud instance running on an underlying computer system that includes one or more processors and system memory, the cloud instance hosting a license server, a method for validating the license server as a target license server for a software license, the method comprising:
    detecting a validation event for the license server, the validation event indicating that the license server is to check its status as the target license server for the software license, the software license being tied to a unique name and being installable at the license server only if the license server establishes an identifier for the license server using a unique identifier that is based on the unique name, the unique name also being associated with a cloud-based object within the cloud computing environment, the license server being enabled to establish the unique identifier as its identifier only if it assumes exclusive ownership of the cloud-based object;
    the license server requesting to assume exclusive ownership of the cloud-based object in response to the validation event, a storage system that stores the cloud-based object enforcing exclusivity of ownership of the cloud-based object, such that only a single license server can own the cloud-based object at any time;
    based on the license server being granted exclusive ownership of the cloud-based object, the license server using the unique name to establish the unique identifier as the identifier for the license server; and
    based on the license server having used the unique name to establish the unique identifier as the identifier for the license server, the license server receiving one or more license requests corresponding to the license.

2. The method as recited in claim 1, wherein detecting a validation event comprises detecting that the software license was stored within the cloud computing environment for installation at a license server having the unique identifier.

3. The method as recited in claim 1, wherein detecting a validation event comprises detecting that a specified period of time has elapsed since the status of the license server was last checked.

4. The method as recited in claim 1, wherein license server requesting to assume exclusive ownership of the cloud-based object comprises the license server requesting to assume exclusive ownership of a storage location in the cloud computing environment associated with the cloud-based object.

5. The method as recited in 4, wherein the unique identifier is the unique name and wherein the unique name is the name of the storage location.

6. A computer program product comprising one or more hardware storage devices having stored thereon computer-executable instructions that, when executed by a processor, cause a license server to perform at least the following:
    detect a validation event for the license server, the validation event indicating that the license server is to check its status as a target license server for the software license, the software license being tied to a unique name and being installable at the license server only if the license server establishes an identifier for the license server using a unique identifier that is based on the unique name, the unique name also being associated with an object within a storage system;
    request to assume exclusive ownership of the object in response to the validation event, the storage system enforcing exclusivity of ownership of the object, such that only a single license server can own the object at any time;
    based on the license server being granted exclusive ownership of the cloud-based object, use the unique name to establish the unique identifier as the identifier for the license server; and
    based on the license server having used the unique name to establish the unique identifier as the identifier for the license server, the license server receiving one or more license requests corresponding to the license.

7. The computer program product as recited in claim 6, wherein detecting a validation event comprises detecting that the software license was stored within the storage system for installation at a license server having the unique identifier.

8. The computer program product as recited in claim 6, wherein detecting a validation event comprises detecting that a specified period of time has elapsed since the status of the license server was last checked.

9. The computer program product as recited in claim 6, wherein requesting to assume exclusive ownership of the object comprises requesting to assume exclusive ownership of the cloud-based object associated with a storage location associated with the object.

10. The computer program product as recited in claim 9, wherein the unique identifier is the unique name and wherein the unique name is the name of the storage location.

11. A computer system, comprising:
    one or more processors; and
    one or more computer-readable media having stored thereon computer-executable instructions that, when executed by the one or more processors, cause the computer system to perform at least the following:
        detecting a validation event for a license server, the validation event indicating that the license server is to check its status as a target license server for a software license, the software license being tied to a unique storage account name and being installable at the license server only if the license server establishes an identifier for the license server using a unique identifier that is based on the unique storage account name, the unique storage account name also being associated with a storage account;
        accessing the storage account that is associated with the unique storage account name;
        requesting to assume exclusive ownership of a unique object that is associated with the storage account in response to the event, a storage system that stores the unique object enforcing exclusivity of ownership of the unique object, such that only a single license server can own the unique object at any time;

receiving an indication that the license server has assumed exclusive ownership of the unique object; and based on the license server having assumed exclusive ownership of the unique object, setting the unique storage account name as the unique identifier for the license server.

12. The computer system as recited in claim 11, wherein the computer-executable instructions also cause the computer system to perform at least the following:

prior to detecting the validation event for the license server, storing the software license for installation at a licensing server having the unique storage account name for its unique identifier.

13. The computer system as recited in claim 12, wherein detecting a validation event for the license server comprises detecting storage of the software license within a cloud computing environment.

14. The computer system as recited in claim 11, wherein detecting a validation event for the license server comprises detecting that a specified period of time has elapsed since the status of the license server was last checked.

15. The computer system as recited in claim 11, wherein accessing the storage account that is associated with the unique storage account name comprises accessing a storage account having a particular unique Domain Name Services ("DNS") name.

16. The computer system as recited in claim 11, wherein requesting to assume exclusive ownership of a unique object that is associated with the storage account comprises requesting to assume exclusive ownership of a page blob within the storage account.

17. The computer system as recited in claim 16, wherein receiving an indication that the license server has assumed exclusive ownership of the unique object comprises the license server receiving an exclusive lease of the page blob.

18. The computer system as recited in claim 17, wherein the computer-executable instructions also cause the computer system to perform at least the following:

mounting the page blob as an xDrive for the exclusive use of a cloud instance corresponding to the license server.

19. The computer system as recited in claim 18, wherein requesting to assume exclusive ownership of a unique object that is associated with the storage account comprises checking the validity of the xDrive.

20. The computer system as recited in claim 11, wherein requesting to assume exclusive ownership of a unique object that is associated with the storage account comprises an ID enforcement plug-in attempting to assume exclusive ownership of the unique object.

* * * * *